(12) United States Patent
Kaul et al.

(10) Patent No.: US 12,682,709 B2
(45) Date of Patent: Jul. 14, 2026

(54) OFFICER IDENTITY VERIFICATION DURING A LOCKDOWN SITUATION

(71) Applicant: MOTOROLA SOLUTIONS, INC., Chicago, IL (US)

(72) Inventors: Scott A Kaul, Streamwood, IL (US); David A Cismesia, Lombard, IL (US); Monica Sieklucki, Lincolnshire, IL (US); Tylor Campbell, Ingleside, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 297 days.

(21) Appl. No.: 18/399,921

(22) Filed: Dec. 29, 2023

(65) Prior Publication Data

US 2025/0218240 A1      Jul. 3, 2025

(51) Int. Cl.
| | |
|---|---|
| *G07C 9/21* | (2020.01) |
| *H04M 1/72421* | (2021.01) |
| *H04M 1/72436* | (2021.01) |
| *H04M 1/72457* | (2021.01) |

(52) U.S. Cl.
CPC .......... *G07C 9/21* (2020.01); *H04M 1/72421* (2021.01); *H04M 1/72436* (2021.01); *H04M 1/72457* (2021.01)

(58) Field of Classification Search
CPC ............... G07C 9/21; H04M 1/72436; H04M 1/72457; H04M 1/72421; H04M 1/72; H04W 40/90; H04W 4/029; H04W 4/90; G06Q 50/26
See application file for complete search history.

(56) References Cited

U.S. PATENT DOCUMENTS

| | | | |
|---|---|---|---|
| 8,941,465 B2 | 1/2015 | Pineau et al. | |
| 9,031,605 B2 | 5/2015 | Czaja et al. | |
| 9,159,210 B2 | 10/2015 | Jones, Jr. et al. | |
| 9,354,619 B2 | 5/2016 | Ergenbright et al. | |
| 10,896,321 B2 | 1/2021 | Dalley, Jr. et al. | |
| 10,964,177 B1 | 3/2021 | Coles | |
| 11,798,331 B2 | 10/2023 | Tan et al. | |
| 2023/0123495 A1* | 4/2023 | Kuenzi | G06F 21/44 |
| | | | 726/6 |
| 2025/0374022 A1* | 12/2025 | Hamilton | H04W 12/63 |

* cited by examiner

*Primary Examiner* — Michael A Faragalla

(57) ABSTRACT

An organization can subscribe to an emergency notification service for alerting emergency service providers when an emergency occurs at a site of the organization, such as an emergency that necessitates a lockdown situation. When an emergency service provider is alerted that a lockdown is in effect, the emergency service provider dispatches responding officers to the scene. Once the responding officers have addressed the situation and it is safe to exit the lockdown, the officers may attempt to access the locked rooms to evacuate the occupants. To verify the identity of an officer seeking access to a room, the officer or a room occupant requests an access phrase via their mobile device. The emergency service provider generates a distinct access phrase and sends it to the officer and the occupant so that when the officer speaks the access phrase the occupant knows it is safe to grant access to the room.

14 Claims, 5 Drawing Sheets

<u>*300*</u>

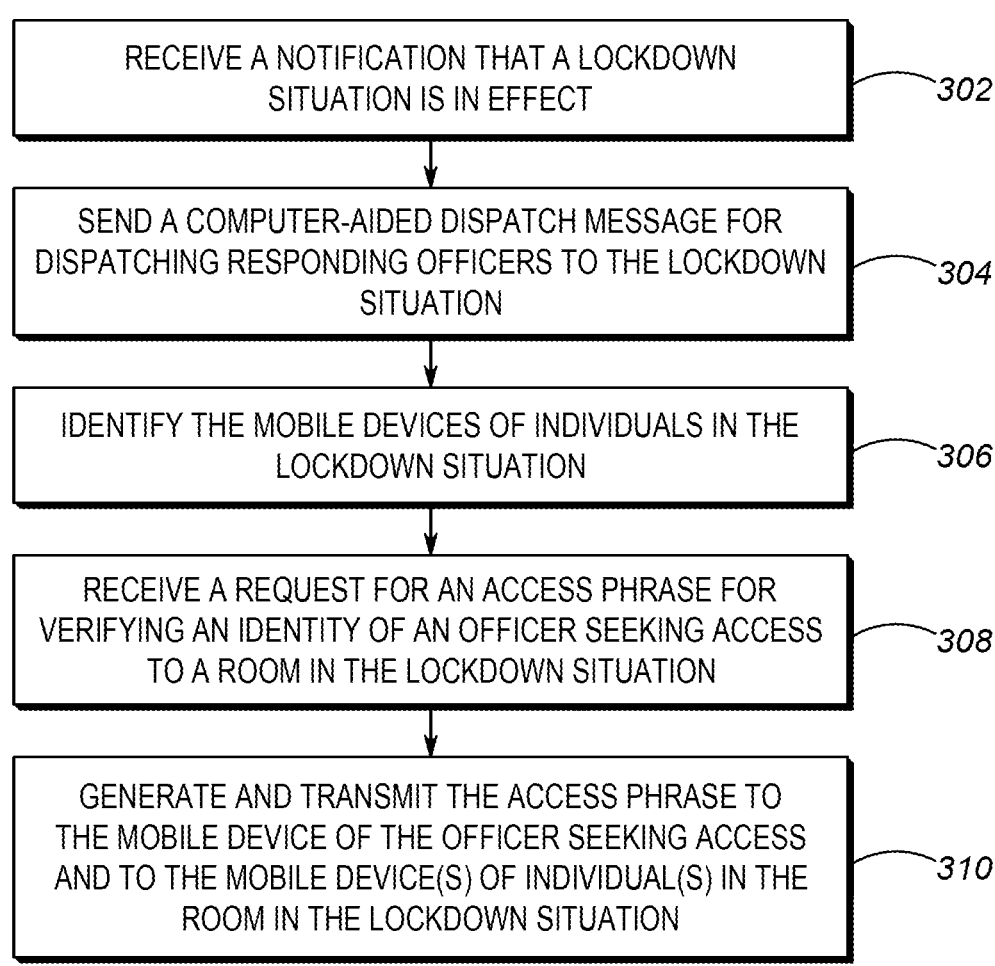

RECEIVE A NOTIFICATION THAT A LOCKDOWN SITUATION IS IN EFFECT ⟶ *302*

SEND A COMPUTER-AIDED DISPATCH MESSAGE FOR DISPATCHING RESPONDING OFFICERS TO THE LOCKDOWN SITUATION ⟶ *304*

IDENTIFY THE MOBILE DEVICES OF INDIVIDUALS IN THE LOCKDOWN SITUATION ⟶ *306*

RECEIVE A REQUEST FOR AN ACCESS PHRASE FOR VERIFYING AN IDENTITY OF AN OFFICER SEEKING ACCESS TO A ROOM IN THE LOCKDOWN SITUATION ⟶ *308*

GENERATE AND TRANSMIT THE ACCESS PHRASE TO THE MOBILE DEVICE OF THE OFFICER SEEKING ACCESS AND TO THE MOBILE DEVICE(S) OF INDIVIDUAL(S) IN THE ROOM IN THE LOCKDOWN SITUATION ⟶ *310*

*FIG. 3*

OFFICER IDENTITY VERIFICATION DURING A LOCKDOWN SITUATION

BACKGROUND

Certain emergency scenarios, such as the presence of an active shooter, may result in a lockdown situation. For instance, if there is an active shooter at a school, innocent bystanders such as teachers, students, and staff members may seek shelter in a nearby classroom or office by locking and/or barricading the door to the room. First responders, such as police officers, may be dispatched to respond to the active shooter situation and, after determining that it is safe to exit the lockdown situation, may attempt to access and evacuate the rooms that are in lockdown.

BRIEF DESCRIPTION OF THE DRAWINGS

FIG. 3 illustrates a method for verifying an identity of an officer seeking access to a room in a lockdown situation, according to some examples.

Figure 1:
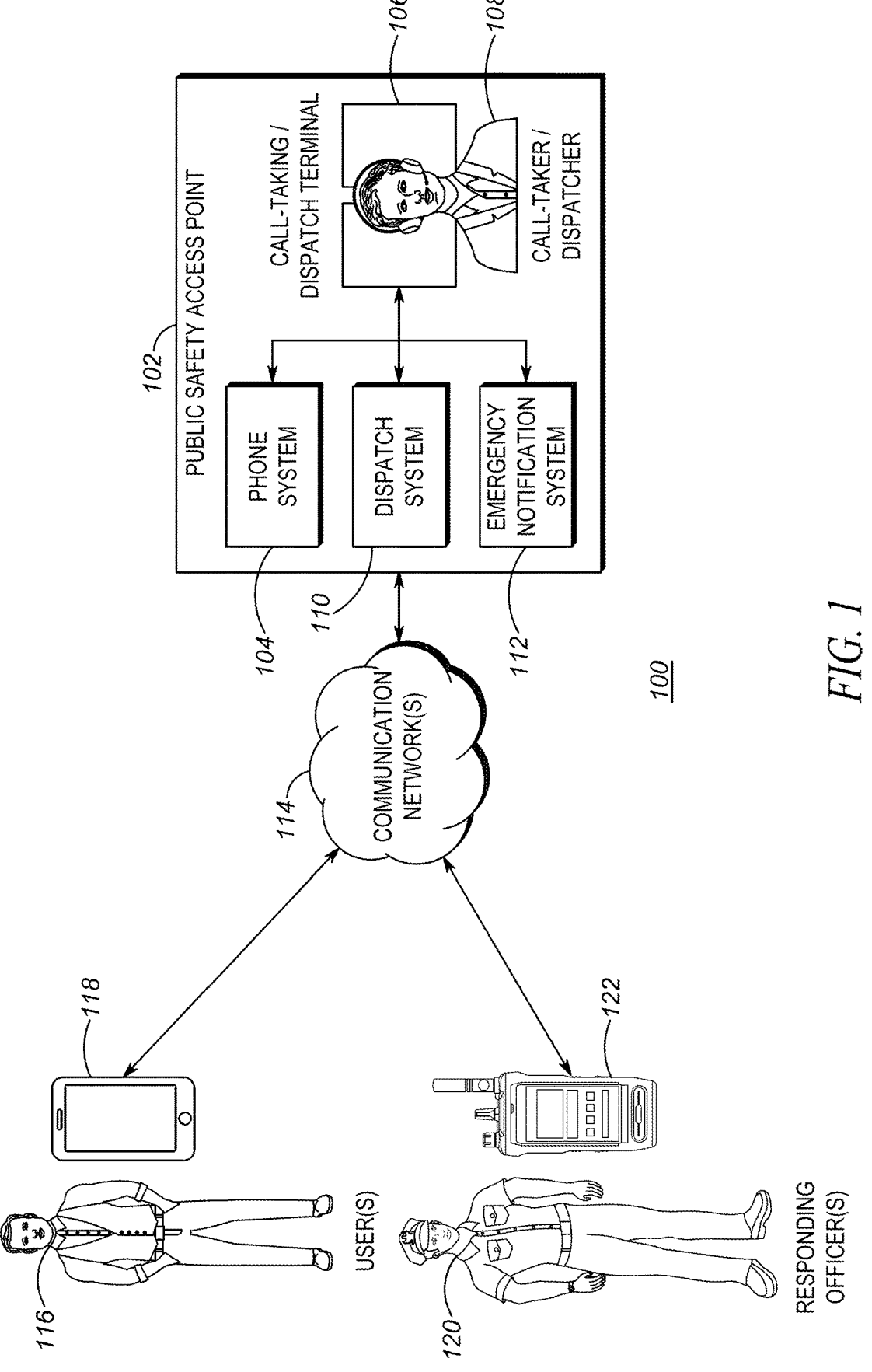
FIG. 1 illustrates a public safety communication system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

As noted above, in a lockdown situation such as those initiated in response to an active shooter, individuals may seek shelter in a nearby room by locking and/or barricading the door to the room and may shelter in place until a responding officer notifies them that it is safe to exit. As used herein, the term "lockdown" is intended to mean an emergency measure or condition in which people are temporarily prevented from entering or leaving a restricted area or building (such as a school) during a threat of danger, or a state of isolation or restricted access instituted as a security measure. The term "lockdown" is also meant to include any situation in which ingress for individuals is restricted.

During such a lockdown situation, an active shooter may attempt to gain access to a room by impersonating an officer, such as by giving a fake name or rank or by presenting a fake badge or ID. In such a scenario, an individual seeking shelter in the room may mistakenly believe that the active shooter situation is resolved and may open the door to the room, thereby granting access to the active shooter and endangering themselves and others in the room.

Thus, there is a need for improved mechanisms for verifying the identity of an officer attempting to access a room in a lockdown situation. One example provides a method involving: (i) receiving a notification that a lockdown situation is in effect; (ii) based on the received notification, (a) sending a computer-aided dispatch (CAD) message for dispatching a plurality of responding officers to the lockdown situation and (b) determining a plurality of mobile devices of individuals in the lockdown situation; (iii) receiving, from at least one of (a) a mobile device of one of the responding officers seeking access to a particular room in the lockdown situation or (b) a mobile device of an individual in the particular room, a request for an access phrase for verifying an identity of the responding officer seeking access; and (iv) based on the request for the access phrase, generating the access phrase and transmitting the access phrase to the mobile device of the responding officer seeking access to the particular room and to the mobile device of the individual in the particular room.

In some aspects of the method, receiving the notification that the lockdown situation is in effect involves receiving the notification from a first mobile device of a first individual in the lockdown situation. And in some aspects of the method, the first mobile device has a first mobile device identifier, and determining the plurality of mobile devices of individuals in the lockdown situation involves: (i) accessing a database comprising a plurality of mobile device identifiers, including the first mobile device identifier, stored in association with an organization identifier; and (ii) determining the plurality of mobile devices of individuals in the lockdown situation based on the plurality of mobile device identifiers stored in association with the organization identifier.

In some aspects of the method, receiving the request for the access phrase involves receiving the request from the mobile device of the responding officer seeking access to the particular room. And in some aspects of the method, the method further involves: (i) receiving location data from the mobile devices of the responding officers and from the mobile devices of the individuals in the lockdown situation; (ii) based on the location data, determining locations of the mobile devices of the responding officers and the mobile devices of the individuals in the lockdown situation; and (iii) determining a set of nearby mobile devices from among the plurality of mobile devices of individuals in the lockdown situation based on the set of nearby mobile devices being located within a threshold distance of the mobile device of the responding officer seeking access to the particular room, wherein the set of nearby mobile devices comprises the mobile device of the individual in the particular room, and wherein transmitting the access phrase to the mobile device of the individual in the particular room comprises transmitting the access phrase to the set of nearby mobile devices.

In some aspects of the method, receiving the request for the access phrase involves receiving the request from the mobile device of the individual in the particular room. And in some aspects of the method, the method further involves: (i) receiving location data from the mobile devices of the responding officers and from the mobile devices of the individuals in the lockdown situation; (ii) based on the location data, determining locations of the mobile devices of the responding officers and the mobile devices of the individuals in the lockdown situation; and (iii) determining a set of nearby officer mobile devices from among the mobile devices of the responding officers based on the set of nearby officer mobile devices being located within a threshold distance of the mobile device of the individual in the particular room from which the request for the access phrase is received, wherein the set of nearby officer mobile devices comprises the mobile device of the responding officer seeking access to the particular room, and wherein transmitting the access phrase to the mobile device of the responding officer seeking access to the particular room comprises transmitting the access phrase to the set of nearby officer mobile devices.

In some aspects of the method, the method further involves: based on the request for the access phrase, transmitting, to the mobile device of the individual in the particular room, personally identifiable information of the responding officer seeking access to the particular room.

In some aspects of the method, generating the access phrase comprises randomly or pseudorandomly generating the access phrase.

In some aspects of the method, the method further involves: based on the received notification, sending a lockdown alert to each mobile device of the plurality of mobile devices of individuals in the lockdown situation.

Another example provides a computing device having at least one processor and a non-transitory computer-readable storage medium comprising program instructions that, when executed by the at least one processor, cause the computing device to perform any or all aspects of the example method described above.

Still another example provides a non-transitory computer-readable storage medium comprising program instructions that, when executed by at least one processor, cause a computing device to perform any or all aspects of the example method described above.

Each of the above-mentioned examples will be discussed in more detail below, starting with example system and device architectures of the system in which the examples may be practiced, followed by an illustration of processing blocks for achieving an improved technical method, device, and system for verifying the identity of an officer seeking access to a room in a lockdown situation.

Examples are herein described with reference to flowchart illustrations and/or block diagrams of methods, apparatus (systems and devices), and computer program products according to examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the operations specified in the flowchart and/or block diagram block or blocks. The methods and processes set forth herein need not, in some examples, be performed in the exact sequence as shown and, where possible, various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 illustrates an example public safety communications system 100. It should be understood that the system 100 is provided as one example and, in some instances, the system 100 may include fewer or additional components than those illustrated. As would be understood by one skilled in the art, FIG. 1 is a simplified diagram and, in practice, public safety communication systems can be more complex than the schematic elements depicted in FIG. 1.

In the illustrated example, the system 100 includes PSAP 102 (for example, an emergency call center) having a phone system 104, a call-taking/dispatching terminal 106, a call-taker/dispatcher 108 associated with the call-taking/dispatching terminal 106, a dispatch system 110, and an emergency notification system 112. While illustrated for simplicity as including a single call-taking/dispatching terminal 106 and call-taker/dispatcher 108, it should be understood that the PSAP 102 may include multiple call-taking/dispatching terminals 106 and multiple call-takers/dispatchers 108. Further, in some examples of the PSAP 102, the call-taking and dispatching functions may be performed by disparate systems, such that the PSAP 102 includes separate call-taking and dispatching terminals as well as separate call-takers and dispatchers that interface with such terminals. Additionally, while the phone system 104, the dispatch system 110, and the emergency notification system 112 are illustrated for simplicity as individual systems residing at the PSAP 102, these systems may alternatively be implemented in a distributed manner at the PSAP 102 and/or remotely from the PSAP 102. In some instances, any or all of these systems are implemented in whole or in part by a cloud computing environment accessible by the PSAP 102.

The PSAP 102 is communicatively connected to a communication network 114 and performs, among other things, computer aided dispatch (CAD) operations to provide emergency services to callers, such as the caller 116 illustrated in FIG. 1. The call-taking/dispatching terminal 106 includes, among other things, a processor (for example, a microprocessor or another suitable programmable device), a memory (i.e., a computer-readable storage medium), and one or more input devices, output devices, or input and output devices including, for example, one or more displays, keyboards, keypads, mice, joysticks, touchscreens, speakers, microphones, and/or headsets. Various other components of the PSAP 102, such as the phone system 104, the dispatch system 110, and the emergency notification system 112 can similarly include a processor and a memory storing program instructions executable by the processor to perform the operations described herein.

The components of the PSAP 102 are communicatively coupled using one or more wired and/or wireless networks. A call-taker/dispatcher 108 interacts with the call-taking/dispatching terminal 106 to answer communications, including emergency calls (e.g., 9-1-1 calls) made to and received at the PSAP 102. For example, a caller 116, using a mobile communication device 118 (e.g., a telephone, a smart telephone, a tablet computer, or another similar device capable of operating as described herein) places an emergency call using the communication network(s) 114 (e.g., a cellular network, the public switched telephone network, the Internet, or another suitable network), and the call is routed to the PSAP 102.

The phone system 104 routes calls received from callers, such as the caller 116, over the communication network(s) 114 to the call-taking/dispatching terminal 106 so that the call-taker/dispatcher 108 may respond to the call. The call may be a voice-based call (e.g., a telephone call, a video call including audio, an audio recording sent via text-to-9-1-1, etc.) or a text-based call (e.g., a multimedia messaging service (MMS) message, a short message service (SMS) message, a real-time text (RTT) message, etc.).

In addition to having the capability of receiving emergency phone calls through the phone system 104, the PSAP 102 also has the capability of receiving information about emergency incidents through the emergency notification system 112. The emergency notification system 112 is configured to receive emergency notifications based on inputs provided by an end-user, such as caller 116, via a user interface of an emergency notification application running on the end-user's mobile device, such as mobile device 118. In this regard, the mobile device 118 includes a front-end software application for receiving user input regarding emergency incidents and transmitting associated emergency notification data to the emergency notification system 112 over the communication network(s) 114, and the emergency notification system 112 includes a back-end software application for receiving the emergency notification data over the communication network(s) 114 and providing the emergency notification data to the call-taking/dispatch terminal 106 for presentation to the call-taker/dispatcher 108.

The call-taker/dispatcher 108 interacts with the call-taking/dispatching terminal 106 to dispatch one or more responding officer(s) 120 to respond to the emergency incident for which the caller 116 is calling or for which the caller 116 has initiated an emergency notification. For example, call-taker/dispatcher 108 inputs information identifying the types and number of responding officer(s) 120 to be dispatched. The call-taking/dispatching terminal 106 provides this information to the dispatch system 110, which then sends a dispatch alert to the mobile device(s) 122 of the responding officer(s) 120 via the communication network(s) 114. The dispatch alert may include information about the incident, such as the incident location, incident type, and identifying information of the caller 116.

The dispatch system 110 routes information between the call-taking/dispatching terminal 106 and the mobile device(s) 122 of the responding officer(s) 120 over the communication network(s) 114. In some examples, the routed information includes voice communications between the responding officer(s) 120 and the call-taker/dispatcher

108. In this regard, the mobile device(s) 122 of the responding officer(s) 120 may include a land mobile radio, and the dispatch system 110, the communication network(s) 114, and the mobile device(s) 122 of the responding officer(s) 120 may operate according to a land mobile radio protocol, such as the Project 25 (P25) standard developed by the Association of Public-Safety Communications Officials (APCO), the Terrestrial Trunked Radio (TETRA) specification, the Digital Mobile Radio (DMR) standard, the Next Generation Digital Narrowband (NXDN) standard, the Digital Private Mobile Radio (dPMR) standard, and/or the OpenSky standard.

The information routed between the call-taking/dispatching terminal 106 and the mobile device(s) 122 of the responding officer(s) 120 over the communication network(s) 114 may take various other forms as well, such as location data (e.g. GPS data) and/or multimedia data. For instance, the mobile device(s) 122 of the responding officer(s) 120 can include a media capture device, such as a microphone and/or camera (e.g., body-worn camera) configured to capture audio and/or of the surroundings of the responding officer(s) 120. In this regard, the mobile device(s) 122 of the responding officer(s) 120 may capture audio and/or video of interactions between the responding officer(s) 120 and the caller 116 or any other individual at the incident scene. In order to provide this captured data to the PSAP 102, the dispatch system 110, the communication network(s) 114, and the mobile device(s) 122 of the responding officer(s) 120 may operate according to a broadband wireless link protocol suitable for transmitting this audio and/or video data, such as the Institute of Electrical and Electronics Engineers (IEEE) 802.11 standard (Wi-Fi), the IEEE 802.16 standard (WiMAX), the Long Term Evolution (LTE) standard, the 5G New Radio (NR) standard, the Code Division Multiple Access 2000 (CDMA2000) standard, the Evolved Packet Core (EPC) standard, and/or one or more satellite broadband protocols.

Figure 2:
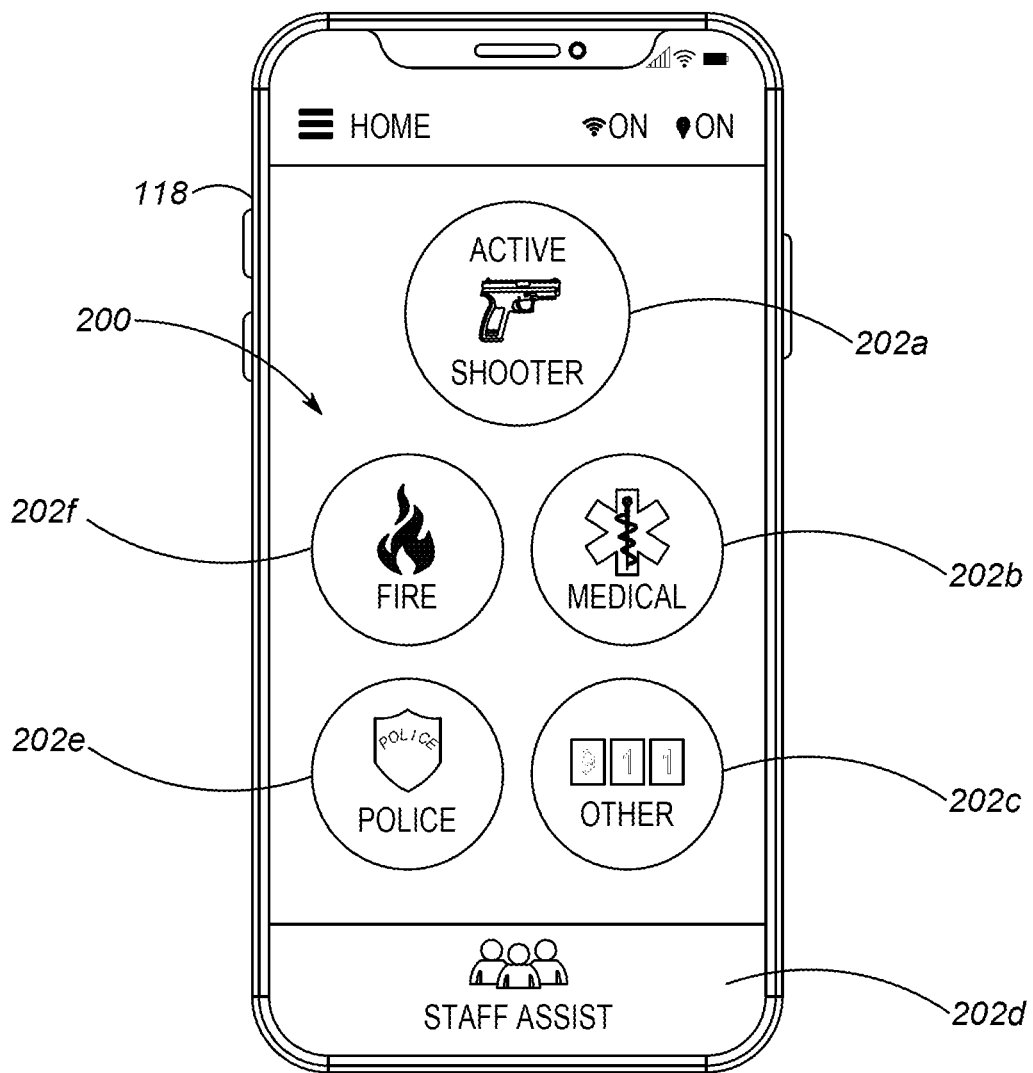
FIG. 2 illustrates a user interface of a mobile device running an emergency notification application, according to some examples.

FIG. 2 depicts an example front-end emergency notification application 200 running on the mobile device 118 of the caller 116. As shown, when running the front-end emergency notification application 200, the mobile device 118 displays a user interface that includes a number of selectable icons 202*a-f* (referred to herein collectively and generically as selectable icons 202). Upon selection by the caller 116, each of the selectable icons 202 causes the front-end emergency notification application 200 to perform a respective task associated with the selected icon 202, as explained in further detail below.

When the caller 116 selects the active shooter icon 202*a*, the emergency notification application 200 causes the mobile device 118 to send an active shooter notification over the communication network(s) 114 to the emergency notification system 112. The active shooter notification can include an identifier of the mobile device 118 (e.g., a phone number, user ID, serial number, or any other identifying information), location data (e.g., GPS data) identifying a location of the mobile device 118, and an alert that an active shooter has been reported.

The emergency notification system 112 can access a database of user profiles, which may be implemented as part of the emergency notification system 112 at the PSAP 102 or may be a cloud-based or other remote database accessible by the emergency notification system 112, to obtain additional information about the caller 116 to assist in responding to the active shooter notification. The user profile database stores user profiles of registered users of the emergency notification application 200. A user profile of a registered user includes various information for identifying the registered user (e.g., the user's name, phone number, physical appearance, and the like) and for use when responding to emergency incidents involving the registered user (e.g., the user's medications, allergies, emergency contacts, and the like). And in examples where the identifier of the mobile device 118 is distinct from the identifying information of the registered user, the identifier of the mobile device 118 is also stored in association with the user profile.

When the emergency notification system 112 receives the active shooter notification including the identifier of the mobile device 118, the emergency notification system 112 queries the user profile database to access the user profile of the caller 116 that is stored in association with the identifier of the mobile device 118. The emergency notification system 112 provides the information in the user profile of the caller 116 as well as an active shooter alert and the location data of the mobile device 118 to the call-taking/dispatch terminal 106 for presentation to the call-taker/dispatcher 108. The call-taker/dispatcher 108 can then dispatch the responding officer(s) 120 to the location of the mobile device 118 in the manner described above.

The emergency notification system 112 additionally sends out active shooter alerts to the mobile devices of any registered users associated with the caller 116. To this end, the emergency notification system 112 stores sets of user profiles in the user profile database in association with one another. For instance, the emergency notification system 112 can associate the user profiles of users who belong to the same organization (e.g., the employees of a business, the faculty of a school, the faculty and students of a school, the members of a club, and the like) with an organization identifier that corresponds to the organization. And when one member of the organization presses the active shooter icon 202a, the emergency notification system 112 identifies all other user profiles associated with the same organization identifier and sends an alert to the mobile devices corresponding to the identified user profiles. In this manner, all registered users in the organization are alerted of the active shooter and can responsively initiate a lockdown emergency response in which the members of the organization lock and/or barricade themselves in a nearby room while the responding officers 120 neutralize the active shooter threat.

As further shown in FIG. 2, the emergency notification application 200 causes the mobile device 118 to display various other selectable icons 202 in addition to the active shooter icon 202a. Examples of these icons include (i) a medical icon 202b, the selection of which causes the mobile device 118 to send a request to the PSAP 102 for emergency medical assistance, (ii) a 9-1-1 icon 202c, the selection of which causes the mobile device 118 to initiate an emergency phone call to the PSAP 102, (iii) a staff assist icon 202d, the selection of which causes the emergency notification system 112 to send a preconfigured or customized notification to registered users within the same organization as the caller 116, (iv) a police icon 202e, the selection of which causes the mobile device 118 to initiate a call to the local police station, and (v) a fire icon 202f, the selection of which causes the mobile device 118 to send an alert to the PSAP 102 that a fire is present and that firefighters should be dispatched to the scene. However, the present disclosure concerns scenarios in which end-users of the emergency notification application 200 are in a lockdown situation, such as when the active shooter icon 202a has been selected. As such, the present disclosure will not provide a detailed explanation of the functions of these other icons 202.

In line with the discussion above, once the caller 116 has selected the active shooter icon 202a, the emergency notification system 112 alerts other registered users in the same organization as the caller 116 of the active shooter, and the organization enters a lockdown situation while the responding officer(s) 120 neutralize the active shooter threat. Once the threat is neutralized, the responding officer(s) 120 may attempt to access various locked down rooms of the organization to evacuate the occupants of the room who have sheltered in place. And, as further noted above, it may be desirable for the room occupants to verify the identity of any responding officer 120 seeking access to the room in order to avoid mistakenly granting access to an active shooter impersonating a responding officer 120. One way to verify the identity of the responding officer 120 seeking access is to provide a unique shared access phrase from a trusted source to both the responding officer 120 and the occupants of the room. In this manner, the room occupants can refuse to grant access to the room unless the responding officer 120 is able to speak or otherwise confirm the shared access phrase, thereby verifying the identity of the responding officer 120. Example implementations of this solution are described in further detail below.

FIG. 3 illustrates an example method 300 implemented by various components of the PSAP 102, such as the emergency notification system 112, the dispatch system 110, and the call-taking/dispatch terminal 106, for verifying the identity of a responding officer 120 attempting to access a room in a lockdown situation.

At block 302, the method 300 involves receiving a notification that a lockdown situation is in effect, such as by receiving a notification of a lockdown situation from a mobile device of an individual in the lockdown situation. In line with the discussion above, in some examples this may involve the emergency notification system 112 receiving an active shooter notification from the mobile device 118 based on the caller 116 selecting the active shooter icon 202a in the emergency notification application 200. And as further described above, in some examples, this may involve the call-taking/dispatch terminal 106 receiving information about the active shooter notification and/or a user profile of the caller 116 from the emergency notification system 112. However, in other examples, the notification of the lockdown situation can be received in other ways. For instance, as further described above, the caller 116 may place an emergency call that is routed to the PSAP 102. The caller 116 may notify the call-taker/dispatcher 108 of the lockdown situation, and the call-taker/dispatcher 108 may send a notification of the lockdown situation to the emergency notification system 112 by way of the call-taking/dispatching terminal 106. Any other examples of receiving such a notification of the lockdown situation are contemplated herein as well.

At block 304, the method 300 involves sending a CAD message for dispatching responding officers 120 to the lockdown situation. In line with the discussion above, this may involve the call-taking/dispatch terminal 106 receiving dispatch instructions from the call-taker/dispatcher 108 and responsively causing the dispatch system 110 to route the dispatch instructions to the mobile devices 122 of the responding officers 120 for instructing the responding officers 120 to respond to the active shooter threat.

At block 306, the method 300 involves identifying the mobile devices of individuals in the lockdown situation. In line with the discussion above, this may involve the emergency notification system 112 receiving an identifier of the mobile device 118 with the active shooter notification and accessing a database of user profiles to determine that the identifier of the mobile device 118 is associated with an organization identifier. The emergency notification system 112 then queries the user profile database to identify all user profiles associated with the organization identifier as well as the mobile devices associated with the identified user profiles.

At block 308, the method 300 involves receiving a request for an access phrase for verifying an identity of an officer 120 seeking access to a room in the lockdown situation. In line with the discussion above, the request for the access phrase may be initiated when one of the responding officers 120 is seeking access to a particular room in a lockdown situation.

Figures 4A, 4B:
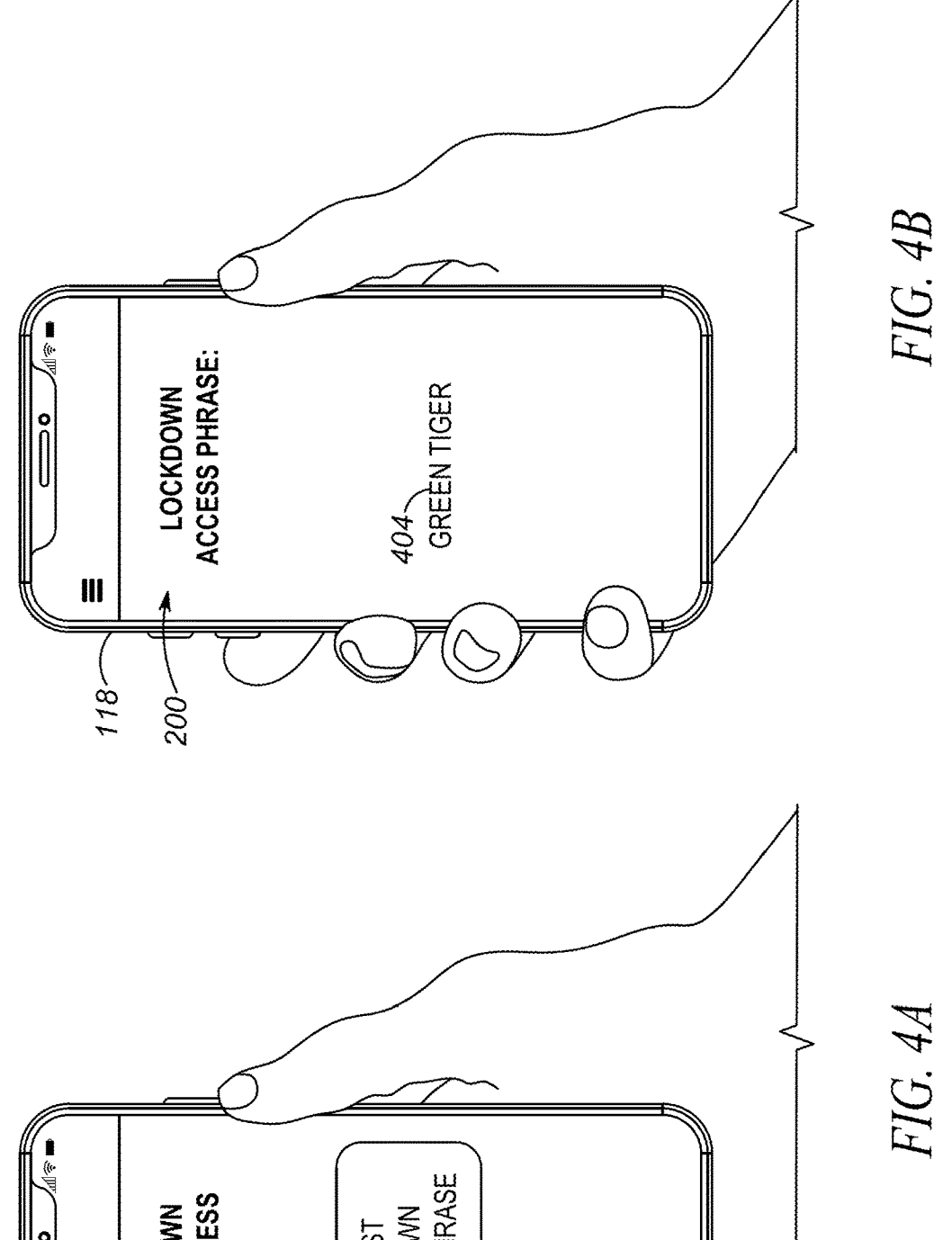
FIG. 4A illustrates another user interface of a mobile device running an emergency notification application, according to some examples.
FIG. 4B illustrates another user interface of a mobile device running an emergency notification application, according to some examples.

FIG. 4A illustrates an example user interface of the mobile device 118 running the emergency notification application 200 through which the caller 116 can request the access phrase while in a locked down room. The emergency notification application 200 may cause the mobile device 118 to display this interface in response to the caller 116 selecting the active shooter icon 202a. As shown, the interface includes a selectable access phrase request button 402. Upon selection of the access phrase request button 402, the mobile device 118 sends an access phrase request over the communication network(s) 114 to the emergency notification system 112. While FIG. 4A depicts the access phrase request button 402 displayed on the mobile device 118 of the caller 116 (i.e., one of the occupants in a locked down room), the mobile device 122 of the responding officer 120 may display the same or similar access phrase request button 402 by also running the emergency notification application 200 (or a public safety version of the emergency notification application 200). Further, in some examples, the responding officer 120 can request the access phrase in other ways, such as by using the mobile device 122 to issue a voice request to the call-taker/dispatcher 108 (e.g., by way of the communication network(s) 114, the dispatch system 110, and the call-taking/dispatch terminal 106), and the call-taker/dispatcher 108 can responsively transmit an access phrase request to the emergency notification system 112 (e.g., by way of the call-taking/dispatch terminal 106) In this manner, the request for the access phrase can be initiated by the responding officer 120 seeking access to the room and/or by any of the individuals sheltering in place in the room.

At block 310, in response to receiving the request for the access phrase, the method 300 involves generating and transmitting the access phrase to the mobile device of the officer 120 seeking access to the room in the lockdown situation and to the mobile devices of individuals in the room, such as to mobile device 118 of caller 116.

The access phrase can take various forms. In some examples, the access phrase is a set of alphanumeric characters, such as a string of alphanumeric characters having a predefined length. In some examples, the access phrase is a single word or a set of words. For instance, the access phrase can take the form of a set of words that can be easily read aloud, as this may make it easier for the responding officer 120 to read the access phrase aloud to the room occupants and may likewise make it easier for the room occupants to hear and confirm the access phrase. As one example, the access phrase can take the form of a two word phrase including an adjective followed by a noun, which is a common grammatical structure in the English language. However, the access phrase can take various other forms as well.

The access phrase can be generated in various ways. In some examples, the emergency notification system 112 randomly or pseudorandomly generates the access phrase. As one example, the emergency notification system 112 can generate the access phrase by randomly or pseudorandomly generating a string of alphanumeric characters of a predefined length. As another example, the emergency notification system 112 can include or have access to a random or pseudorandom word or phrase generator, which the emergency notification system 112 can leverage to randomly or pseudorandomly generate one or more words of the access phrase. As yet another example, the emergency notification system may store or otherwise have access to a set of preconfigured access phrases and may generate the access phrase by randomly or pseudorandomly selecting one of the preconfigured access phrases. Any other techniques for generating the access phrase can be employed as well.

Further, the access phrase can be transmitted to the mobile device of the officer 120 seeking access to the room in the lockdown situation and to the mobile devices of individuals in the room in various ways. In some examples, the emergency notification system 112 can broadly transmit the access phrase to all mobile devices involved in the lockdown situation. For instance, the emergency notification system 112 can transmit the access phrase over the communication network(s) 114 to all of the mobile devices associated with the same organization as the caller 116 and identified at block 306 while also causing the dispatch system 110 to transmit the access phrase to all of the mobile devices 122 of the responding officers 120 dispatched to the lockdown situation at block 304.

In other examples, the emergency notification system 112 can take a more targeted approach. As one example, when the mobile device that initiated the request for the access phrase is a mobile device of an individual in a locked down room, such as mobile device 118 of caller 116, the emergency notification system 112 can send the access phrase to the requesting mobile device as well as to any mobile devices 122 of responding officers 120 within a threshold distance (e.g., 10 meters) of the requesting mobile device. To do so, the emergency notification system 112 can receive location data of the requesting mobile device, which the requesting mobile device can send periodically and/or in response to selection of the access phrase request button 402, as well as location data of the mobile devices 122 of the responding officers 120, which (as noted above) the mobile devices 122 provide to the dispatch system 110. Based on this location data, the emergency notification system 112 can determine the locations of the requesting mobile device and the mobile devices 122 of the responding officers 120 for purposes of identifying which mobile devices 122 of the responding officers 120 are within the threshold distance of the requesting mobile device. Similarly, when the mobile device that initiated the request for the access phrase is a mobile device 122 of a responding officer 120, the emergency notification system 112 can send the access phrase to the requesting mobile device as well as to any mobile devices of locked down individuals (e.g., the mobile devices identified at block 306) within the threshold distance of the requesting mobile device. To facilitate this, the emergency notification system 112 can receive location data from each of the mobile devices of the locked down individuals, perhaps in response to the caller 116 selecting the active shooter icon 202a, and can use this data in a similar manner to determine the locations of these mobile devices and transmit the access phrase to the mobile devices within the threshold distance of the requesting mobile device.

After the transmission of the access phrase at block 310, the mobile devices that receive the access phrase display a visual representation of the access phrase. FIG. 4B illustrates an example user interface of the mobile device 118 running the emergency notification application 200 through which the mobile device 118 can display the access phrase 404. As shown, the displayed access phrase takes the form of a two-word phrase including an adjective followed by a noun—namely, "Green Tiger." However, in other examples, the access phrase can take any of the forms described above. While FIG. 4B depicts the access phrase 404 being displayed on the mobile device 118 of the caller 116 (i.e., one of the occupants in a locked down room), the mobile device 122 of the responding officer 120 may display the access phrase 404 in the same or similar manner by also running the emergency notification application 200 (or a public safety version of the emergency notification application 200).

Further, while not depicted in FIG. 4B, in some examples, in addition to transmitting the access phrase, the emergency notification system 112 can transmit personally identifiable information of the responding officer 120 seeking access to the locked down room for display alongside the access phrase. For instance, the emergency notification system 112 can identify the responding officer 120 seeking access to the room based on the responding officer 120 initiating the request for the access phrase and/or based on location data from the mobile device 122 of the responding officer 120, as described above. Upon identifying the responding officer 120 seeking access to the room, the emergency notification system 112 can request and receive personally identifiable information of the officer 120 from the dispatch system 110, which can be configured to store personally identifiable information for each of the responding officers 120. The personally identifiable information can take various forms and can include, for instance, a name, badge number, rank, photograph, and the like, of the responding officer 120. In this manner, the individuals in the locked down room can use both the access phrase and the personally identifiable information to verify the identity of the responding officer 120 seeking access to the room.

Figure 5:
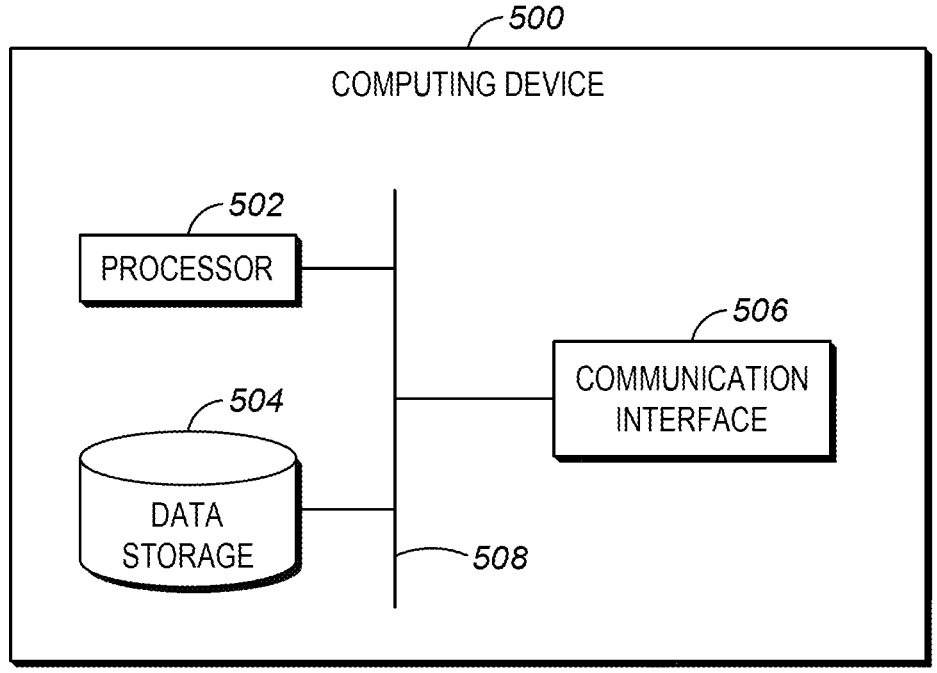
FIG. 5 illustrates a schematic diagram of a computing device for performing the operations described herein, according to some examples.

Attention is next directed to FIG. 5, which depicts a schematic block diagram of an example computing device 500. The computing device 500 may represent a structure of any suitable component of the public safety communications system 100, including, but not limited to, the PSAP 102, the phone system 104, the call-taking/dispatching terminal 106, the dispatch system 110, the emergency notification system 112, the mobile device 118 of the caller 116 (and/or any other individual in the lockdown situation), and the mobile devices 122 of the responding officers 120. While the computing device 500 is depicted in FIG. 5 as a single component, when the computing device 500 represents a structure of the public safety communications system 100, functionality of the computing device 500 may be distributed among a plurality of components. Further, in such examples, functionality of the PSAP 102, the phone system 104, the call-taking/dispatching terminal 106, the dispatch system 110, the emergency notification system 112, the mobile device 118 of the caller 116 (and/or any other individual in the lockdown situation), and the mobile devices 122 of the responding officers 120 may be combined in any suitable manner.

As depicted, the computing device 500 includes at least a processor 502, a data storage 504, and a communication interface 506, all of which may be communicatively linked by a communication link 508, which may take the form of a system bus or some other connection mechanism.

The processor 502 may comprise one or more processor components, such as general-purpose processes (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed.

The data storage 504 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. The data storage 504 may also be provisioned with software components that enable the computing device 500 to carry out the operations disclosed herein. These software components may generally take the form of program instructions that are executable by the processor 502 to carry out the disclosed operations.

The communication interface 506 may be configured to facilitate wired and/or wireless communication with other computing devices or systems. As such, the communication interface 506 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wired and/or wireless communication. The communication interface 506 may also include multiple communication interfaces of different types. Other configurations are possible as well.

Although not shown, the computing device 500 may additionally include one or more other interfaces that provide connectivity with external user-interface components (sometimes referred to as "peripherals"), such as a keyboard, a mouse or trackpad, a display screen, a touch-sensitive interface, a stylus, a microphone, a headset, speakers, etc., which may allow for direct user interaction with the computing device 500.

It should be understood that the computing device 500 is one example of a computing device that may be used with the embodiments described herein. Numerous other arrangements are possible and contemplated herein. For instance, other computing devices may include additional components not pictured and/or more or fewer of the pictured components.

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having,"

"includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various examples may be written in an object oriented programming language such as Java, Smalltalk, C++, Python, or the like. However, the computer program code for carrying out operations of various examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computing device comprising:

at least one processor; and a non-transitory computer-readable storage medium comprising program instructions that, when executed by the at least one processor, cause the computing device to perform a set of operations comprising:

receiving a notification that a lockdown situation is in effect;

based on the received notification, (i) sending a computer-aided dispatch (CAD) message for dispatching a plurality of responding officers to the lockdown situation and (ii) determining a plurality of mobile devices of individuals in the lockdown situation;

receiving, from at least one of (i) a mobile device of one of the responding officers seeking access to a particular room in the lockdown situation or (ii) a mobile device of an individual in the particular room, a request for an access phrase for verifying an identity of the responding officer seeking access, wherein receiving the request for the access phrase comprises receiving the request from the mobile device of the responding officer seeking access to the particular room, and wherein the set of operations further comprises:

receiving location data from the mobile devices of the responding officers and from the mobile devices of the individuals in the lockdown situation;

based on the location data, determining locations of the mobile devices of the responding officers and the mobile devices of the individuals in the lockdown situation; and determining a set of nearby mobile devices from among the plurality of mobile devices of individuals in the lockdown situation based on the set of nearby mobile devices being located within a threshold distance of the mobile device of the responding officer seeking access to the particular room, wherein the set of nearby mobile devices comprises the mobile device of the individual in the particular room; and based on the request for the access phrase, generating the access phrase and transmitting the access phrase to the mobile device of the responding officer seeking access to the particular room and to the mobile device of the individual in the particular room, wherein transmitting the access phrase to the mobile device of the individual in the particular room comprises transmitting the access phrase to the set of nearby mobile devices.

2. The computing device of claim 1, wherein receiving the notification that the lockdown situation is in effect comprises receiving the notification from a first mobile device of a first individual in the lockdown situation.

3. The computing device of claim 2, wherein the first mobile device has a first mobile device identifier, and wherein determining the plurality of mobile devices of individuals in the lockdown situation comprises:

accessing a database comprising a plurality of mobile device identifiers, including the first mobile device identifier, stored in association with an organization identifier; and determining the plurality of mobile devices of individuals in the lockdown situation based on the plurality of mobile device identifiers stored in association with the organization identifier.

4. The computing device of claim 1, the set of operations further comprising:

based on the request for the access phrase, transmitting, to the mobile device of the individual in the particular room, personally identifiable information of the responding officer seeking access to the particular room.

5. The computing device of claim 1, wherein generating the access phrase comprises randomly or pseudorandomly generating the access phrase.

6. The computing device of claim 1, the set of operations further comprising:

based on the received notification, sending a lockdown alert to each mobile device of the plurality of mobile devices of individuals in the lockdown situation.

7. A method comprising:

receiving a notification that a lockdown situation is in effect;

based on the received notification, (i) sending a computer-aided dispatch (CAD) message for dispatching a plurality of responding officers to the lockdown situation and (ii) determining a plurality of mobile devices of individuals in the lockdown situation;

receiving, from at least one of (i) a mobile device of one of the responding officers seeking access to a particular room in the lockdown situation or (ii) a mobile device of an individual in the particular room, a request for an access phrase for verifying an identity of the responding officer seeking access, wherein receiving the request for the access phrase comprises receiving the request from the mobile device of the responding officer seeking access to the particular room, and wherein the method further comprises:

receiving location data from the mobile devices of the responding officers and from the mobile devices of the individuals in the lockdown situation;

based on the location data, determining locations of the mobile devices of the responding officers and the mobile devices of the individuals in the lockdown situation; and determining a set of nearby mobile devices from among the plurality of mobile devices of individuals in the lockdown situation based on the set of nearby mobile devices being located within a threshold distance of the mobile device of the responding officer seeking access to the particular room, wherein the set of nearby mobile devices comprises the mobile device of the individual in the particular room; and based on the request for the access phrase, generating the access phrase and transmitting the access phrase to the mobile device of the responding officer seeking access to the particular room and to the mobile device of the individual in the particular room, wherein transmitting the access phrase to the mobile device of the individual in the particular room comprises transmitting the access phrase to the set of nearby mobile devices.

8. The method of claim 7, wherein receiving the notification that the lockdown situation is in effect comprises receiving the notification from a first mobile device of a first individual in the lockdown situation.

9. The method of claim 8, wherein the first mobile device has a first mobile device identifier, and wherein determining the plurality of mobile devices of individuals in the lockdown situation comprises:

accessing a database comprising a plurality of mobile device identifiers, including the first mobile device identifier, stored in association with an organization identifier; and determining the plurality of mobile devices of individuals in the lockdown situation based on the plurality of mobile device identifiers stored in association with the organization identifier.

10. The method of claim 7, further comprising:

based on the request for the access phrase, transmitting, to the mobile device of the individual in the particular room, personally identifiable information of the responding officer seeking access to the particular room.

11. A non-transitory computer-readable storage medium comprising program instructions that, when executed by at least one processor, cause a computing device to perform a set of operations comprising:

receiving a notification that a lockdown situation is in effect;

based on the received notification, (i) sending a computer-aided dispatch (CAD) message for dispatching a plurality of responding officers to the lockdown situation and (ii) determining a plurality of mobile devices of individuals in the lockdown situation;

receiving, from at least one of (i) a mobile device of one of the responding officers seeking access to a particular room in the lockdown situation or (ii) a mobile device of an individual in the particular room, a request for an access phrase for verifying an identity of the responding officer seeking access, wherein receiving the request for the access phrase comprises receiving the request from the mobile device of the responding officer seeking access to the particular room, and wherein the set of operations further comprises:

receiving location data from the mobile devices of the responding officers and from the mobile devices of the individuals in the lockdown situation;

based on the location data, determining locations of the mobile devices of the responding officers and the mobile devices of the individuals in the lockdown situation; and determining a set of nearby mobile devices from among the plurality of mobile devices of individuals in the lockdown situation based on the set of nearby mobile devices being located within a threshold distance of the mobile device of the responding officer seeking access to the particular room, wherein the set of nearby mobile devices comprises the mobile device of the individual in the particular room; and based on the request for the access phrase, generating the access phrase and transmitting the access phrase to the mobile device of the responding officer seeking access to the particular room and to the mobile device of the individual in the particular room, wherein transmitting the access phrase to the mobile device of the individual in the particular room comprises transmitting the access phrase to the set of nearby mobile devices.

12. The non-transitory computer-readable storage medium of claim 11, wherein receiving the notification that the lockdown situation is in effect comprises receiving the notification from a first mobile device of a first individual in the lockdown situation.

13. The non-transitory computer-readable storage medium of claim 12, wherein the first mobile device has a first mobile device identifier, and wherein determining the plurality of mobile devices of individuals in the lockdown situation comprises:

accessing a database comprising a plurality of mobile device identifiers, including the first mobile device identifier, stored in association with an organization identifier; and determining the plurality of mobile devices of individuals in the lockdown situation based on the plurality of mobile device identifiers stored in association with the organization identifier.

14. The non-transitory computer-readable storage medium of claim 11, the set of operations further comprising:

based on the request for the access phrase, transmitting, to the mobile device of the individual in the particular room, personally identifiable information of the responding officer seeking access to the particular room.

* * * * *